United States Patent
Lesch et al.

(10) Patent No.: US 7,540,512 B2
(45) Date of Patent: Jun. 2, 2009

(54) WHEEL CARRIER UNIT COMPRISING AN INTEGRATED BRAKE APPLICATION UNIT

(75) Inventors: Martin Lesch, Waiblingen (DE); Uwe Mauz, Esslingen (DE); Christian Quinger, Schorndorf (DE)

(73) Assignee: Daimler AG, Stuttgart (DE)

( * ) Notice: Subject to any disclaimer, the term of this patent is extended or adjusted under 35 U.S.C. 154(b) by 469 days.

(21) Appl. No.: 11/316,670

(22) Filed: Dec. 22, 2005

(65) Prior Publication Data

US 2006/0119169 A1    Jun. 8, 2006

Related U.S. Application Data

(63) Continuation-in-part of application No. PCT/EP2004/006569, filed on Jun. 18, 2004.

(30) Foreign Application Priority Data

Jun. 26, 2003    (DE) ................. 103 28 679

(51) Int. Cl.
*B62D 7/18* (2006.01)
*F16D 65/12* (2006.01)

(52) U.S. Cl. ............. 280/93.512; 188/71.1; 188/73.31; 188/73.39

(58) Field of Classification Search ................ 280/80.1, 280/93.512; 301/125; 188/71.1, 73.31, 73.39
See application file for complete search history.

(56) References Cited

U.S. PATENT DOCUMENTS

| | | | | |
|---|---|---|---|---|
| 3,940,159 A | * | 2/1976 | Pringle | 280/88 |
| 3,941,221 A | * | 3/1976 | Pringle | 188/218 XL |
| 4,031,986 A | * | 6/1977 | Thompson | 188/72.4 |
| 5,022,673 A | * | 6/1991 | Sekino et al. | 280/124.138 |
| 5,338,055 A | * | 8/1994 | Mauz | 280/124.147 |
| 5,911,425 A | * | 6/1999 | Hofmann et al. | 280/93.512 |
| 6,223,863 B1 | * | 5/2001 | Bunker | 188/18 A |
| 6,298,953 B1 | * | 10/2001 | Bunker | 188/71.1 |
| 6,712,185 B2 | * | 3/2004 | Wallentin et al. | 188/218 XL |
| 6,945,370 B1 | * | 9/2005 | Bunker | 188/71.1 |

FOREIGN PATENT DOCUMENTS

| | | |
|---|---|---|
| DE | 2 148 797 | 4/1973 |
| EP | 0 944 509 | 6/2002 |
| WO | WO 98/25804 | 6/1998 |

* cited by examiner

*Primary Examiner*—John Q. Nguyen
*Assistant Examiner*—George D. Spisich
(74) *Attorney, Agent, or Firm*—Klaus J. Bach

(57) ABSTRACT

In a wheel carrier unit comprising a basic wheel carrier member, a support member connecting the basic wheel carrier member to a vehicle body by way of axle links, and a brake cylinder arranged thereon, the brake cylinder is disposed on the side of the wheel carrier unit remote from the wheel location and a housing for a brake application unit serving as mechanical force transmission unit is formed on the opposite side of the wheel carrier unit.

8 Claims, 2 Drawing Sheets

WHEEL CARRIER UNIT COMPRISING AN INTEGRATED BRAKE APPLICATION UNIT

This is a Continuation-In-Part Application of International Application PCT/EP2004/006569 field Jun. 18, 2004 and claiming the priority of German Application 103 28 679.9 filed Jun. 26, 2003.

BACKGROUND OF THE INVENTION

The invention relates to a wheel carrier unit with an integrated brake force application structure, including a basic wheel carrier, an axle support structure connecting the wheel carrier to a vehicle body and a brake cylinder mounted on the axle support structure.

EP 0 944 509 B1 discloses a wheel suspension connecting element for a wheel of a motor vehicle, which comprises the cylinder of a piston-cylinder unit of a disc brake, that is integrally formed with the connecting element.

It is the object of the present invention is to specify a lightweight wheel carrier unit which is inexpensive to manufacture and which takes up little overall space.

SUMMARY OF THE INVENTION

In a wheel carrier unit comprising a basic wheel carrier member, an axle support member connecting the basic wheel carrier member to a vehicle body by way of axle links, and a brake cylinder arranged thereon, the brake cylinder is arranged on the side of the wheel carrier unit remote from the wheel location and a housing for a brake application unit serving as mechanical force transmission unit is formed on the opposite side of the wheel carrier unit.

The wheel carrier unit according to the invention has a brake cylinder on its side remote from the wheel. This has the advantage that the brake cylinder is arranged on the side of the wheel carrier on which the brake lines are also situated. The brake lines do not have to extend through the wheel carrier unit. Opposite the wheel, the brake cylinder is protected by the wheel carrier unit. This means that the hydraulic, pneumatic or electrical side of the brake system is separated by the wheel carrier unit from the mechanical force transmission of the wheel brake. In a hydraulic brake system this has the advantage that the wheel brake is not adversely exposed to fouling by the hydraulic part, for example when changing the brake fluid or bleeding the brakes, or when leaks occur in the hydraulic brake system. In extreme cases brake fluid could otherwise get onto the brake linings and could lead to a partial or complete failure of the braking system.

A housing for a brake application unit serving as mechanical force transmission unit is formed on the side of the inventive wheel carrier unit facing the wheel. The housing is therefore not an additional component and the need for components to attach the housing to the wheel carrier unit is eliminated. The cost of assembly and the associated costs are reduced. The housing can be manufactured by the same method and in the same manufacturing process as the wheel carrier, for example by casting or forging.

In one embodiment the attachment of the wheel carrier unit to the vehicle body by way of axle links takes the form of a forked support arm, having a basic support arm which is attached by way of axle links to the vehicle body and which is connected by two lateral support arms to the basic wheel carrier structure. The advantage of this embodiment lies in the lightweight construction. With the basic wheel carrier structure the lateral support arms form a stable triangular structure, which, despite its low weight, has a high load-bearing capacity. This applies in particular if a low-strength material is used. The space between the two lateral support arms may be used for the space-saving attachment of additional components.

In a preferred embodiment the brake cylinder is arranged in a mounting space formed by the forked axle support arm. This represents a particularly compact way of fitting the brake cylinder.

In an especially advantageous embodiment a part of the wheel carrier unit is designed as a brake cylinder holder. This serves to further reduce the number of components needed. With an integral design of the wheel carrier unit and the brake cylinder holder the brake cylinder can be arranged especially tightly on the wheel carrier unit. The position of the brake cylinder on the wheel carrier unit and its position relative to the brake application unit can be precisely fixed by the brake cylinder holder. In particular it is possible to provide passages through the wheel carrier unit, which serve for the force transmission between the brake cylinder and the brake application unit. This arrangement provides for an optimally aligned force transmission chain between brake cylinder and brake application unit which is protected from ambient influences.

In one embodiment a part of the wheel carrier unit is designed as a bridge holder for a bridge of a disc brake. The holder is integrally joined to the wheel carrier unit. This also eliminates the need for additional components. The holder consists of the same material as the overall wheel carrier. The forces acting on the holder are braced against the vehicle body by way of the wheel carrier unit and axle links. This ensures an optimum transmission of the forces, which during braking act upon the bridge holder of the bridge, to the wheel carrier structure.

In an especially advantageous embodiment of the invention the bridge holder for the bridge of a disc brake is formed in such a way that the fasteners for fixing the bridge to the holder are aligned approximately tangentially to the brake disc. When the disc brake is actuated the brake linings are applied against a brake disc. This reduces the rotational movement of the brake disc. The braking action is opposed to the rotational movement of the brake disc. Fasteners aligned tangentially to the brake disc are therefore oriented parallel to this braking action of the disc brake. The braking action of the disc brake leads to a compressive or tensile strain of the fasteners. Fasteners arranged perpendicular to the braking action are on the other hand subjected to shear strain. Conventional fasteners such as bolts, for example, are less able to withstand shear loading than compressive or tensile strain. For the same design, the fasteners can thereby support a greater load if they are aligned tangentially to the brake disc.

It is advantageous to form the wheel carrier unit from a casting. The advantage to this is that a high-strength geometrical design will permit the use of lesser grade materials. In this way it is possible to provide an inexpensive wheel carrier unit that is capable of meeting high load requirements.

Further features and combinations of features will become apparent from the following description of the invention with reference to the accompanying drawings:

DESCRIPTION OF A PARTICULAR EMBODIMENT

Figure 1:
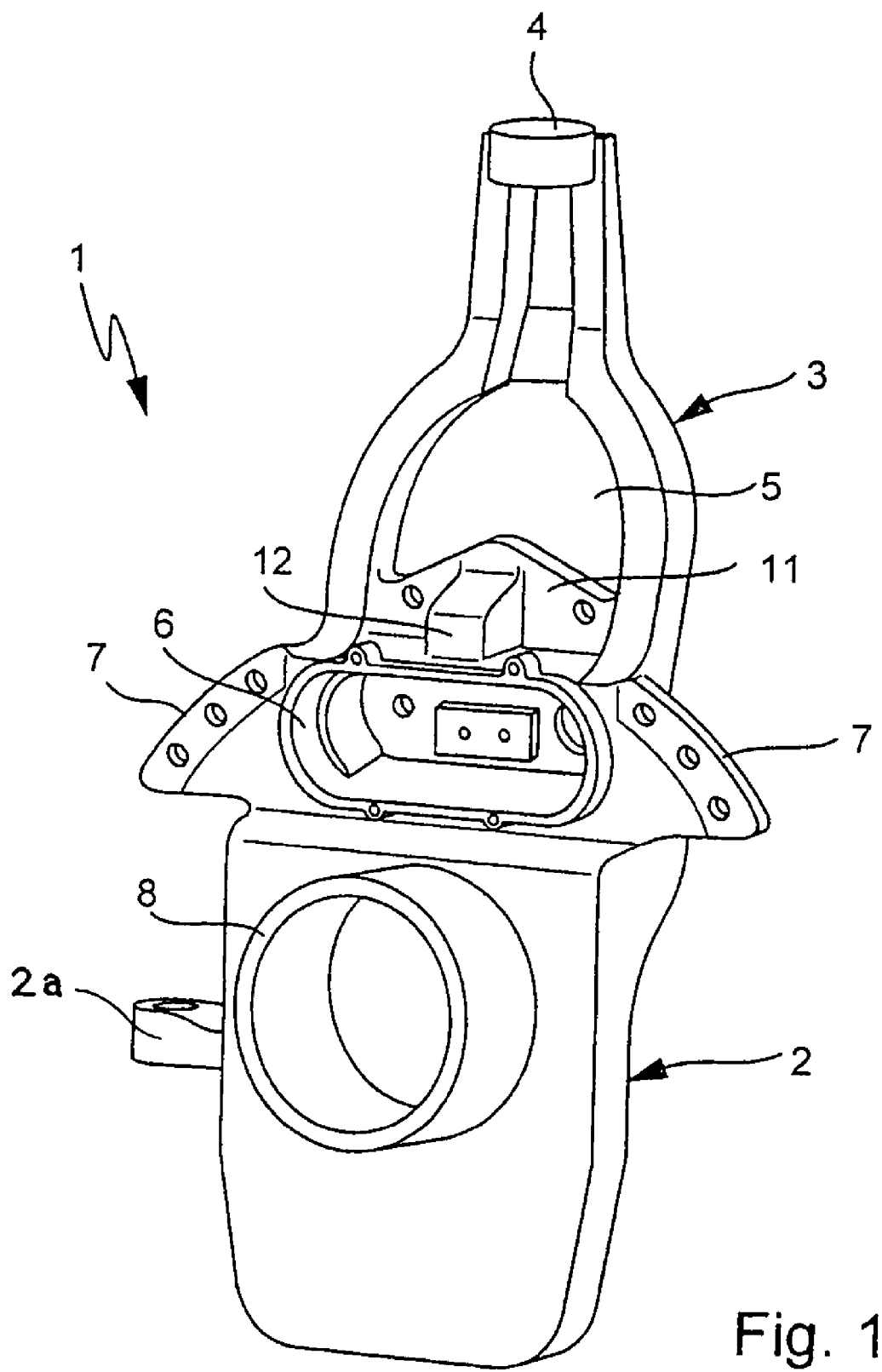
FIG. 1 shows an embodiment of a wheel carrier unit according to the invention having an integral housing for a brake application unit.

FIG. 1 shows the wheel carrier unit 1 according to the invention. The wheel carrier unit 1 has a basic wheel carrier member 2 and a support arm 3 extending therefrom, which connects the wheel carrier unit 1 via axle links to a body of a vehicle.

The support arm 3 is of forked design with a connecting structure 4 arranged at the top, from which two lateral support arms extend downwards. The basic support arm is oriented approximately vertically and inclined slightly in the direction of the lateral support arms towards the center of the vehicle. The lateral support arms extend downwards from the connecting structure 4 towards the vehicle wheel.

In the embodiment shown in FIG. 1 the connecting structure 4 has a mounting bore (not shown). By means of a bolt or the like, the support arm 3 is fixed to an axle link by way of the connecting structure 4. In this way the wheel carrier unit 1 is attached to a vehicle body.

The two lateral support arms of the forked support arm 3 open toward the basic wheel carrier member 2.

The basic wheel carrier member 2 is disposed in a plane extending essentially transversely to the direction of travel and perpendicular to the road surface. The base area of the basic wheel carrier member 2 is offset towards the vehicle wheel in relation to the support arm 3. The base area of the basic wheel carrier member 2 forms an approximately rectangular base plate. From this base plate of the basic wheel carrier member 2 a wheel bearing mounting sleeve 8 projects towards the vehicle wheel.

The basic wheel carrier member 2 furthermore has a mounting structure for a track rod and axle links. In the embodiment shown in FIG. 1 one of these structures 2a is arranged on the longitudinal side of the base plate pointing in the direction of travel, approximately level with the wheel hub 20. In the embodiment represented in FIG. 2 and FIG. 3 the other mounting structure 2b is arranged at the bottom on the side of the base plate remote from the vehicle wheel.

In the area between the support arm 3 and the basic wheel carrier member 2 a housing 6 is formed for a brake force application unit 13 of a wheel brake. The function of this brake force application unit 13 is to convert the brake signal relayed hydraulically, pneumatically, mechanically or electronically from a brake system into a mechanical actuation of a wheel brake arranged on the wheel carrier unit 1.

The function of the housing 6 is to protect the brake application unit 13 from fouling and damage. The brake application unit 13 is firmly positioned in the housing 6 and when actuated is supported by the housing 6. The housing 6 has various guides, holes and stepped offsets which serve to ensure the working of the brake application unit 13 and its correct seating in the housing 6.

At the inside the housing 6 has two round holes in the rear wall. In the embodiment represented in FIG. 1 the two holes are of different size. The larger hole serves to accommodate a wear sensor and the smaller hole serves as access for readjustment of the brake application unit 13. Between the two holes a straight rectangular plate having two depressions is disposed on the inside of the housing. This plate serves as counter-bearing and mounting for the brake application unit 13. The brake application unit 13 is aligned by means of two pins, which are guided in the two depressions and are aligned in the housing 6.

In the exemplary embodiment represented in FIG. 1 the two side walls of the housing 6 are of semicircular shape. They serve as guides for two pressure pistons of a pressure piece. Close to the edge of the housing 6, the semicircular side walls have a stepped offset and the radius is increased. This area serves for mounting gears and a pressure plate arranged on the pressure piece.

The upper wall and lower wall of the housing 6 are flat straight walls. Two threaded holes extend from the front of the housing 6 rearwards towards the rear wall. Four threaded bolts connected to a cover plate of the brake application unit 13 are fitted into the threaded holes. In this way the brake application unit 13 is firmly connected to its housing 6.

A bridge holder 7 for the bridge 17 of the disc brake is arranged to the left and to the right of the housing 6 of the brake application unit 13. This allows the bridge 17 of the disc brake to be fixed firmly to the wheel carrier unit 1. In the embodiment represented in FIG. 1 to FIG. 3 the bridge holder 7 has a left-hand and a right-hand part, between which the housing 6 of the brake application unit 13 is arranged.

The gap between the two lateral support arms of the support arm 3 forms a mounting opening 5 for accommodating the brake cylinder. This means that the brake cylinder 9 can be arranged tightly against the wheel carrier unit 1.

A brake cylinder holder 11 is arranged between the two lateral support arm branches of the support arm 3 in the area of the basic wheel carrier member 2. The brake cylinder holder 11 is part of the wheel carrier unit 1. In the embodiment represented in FIG. 1 the brake cylinder holder 11 has two holes for bolting the brake cylinder 9 to the wheel carrier unit 1. A further hole leads to a cavity, which accommodates a release mechanism mounting 12 for the brake cylinder 9.

Figure 2:
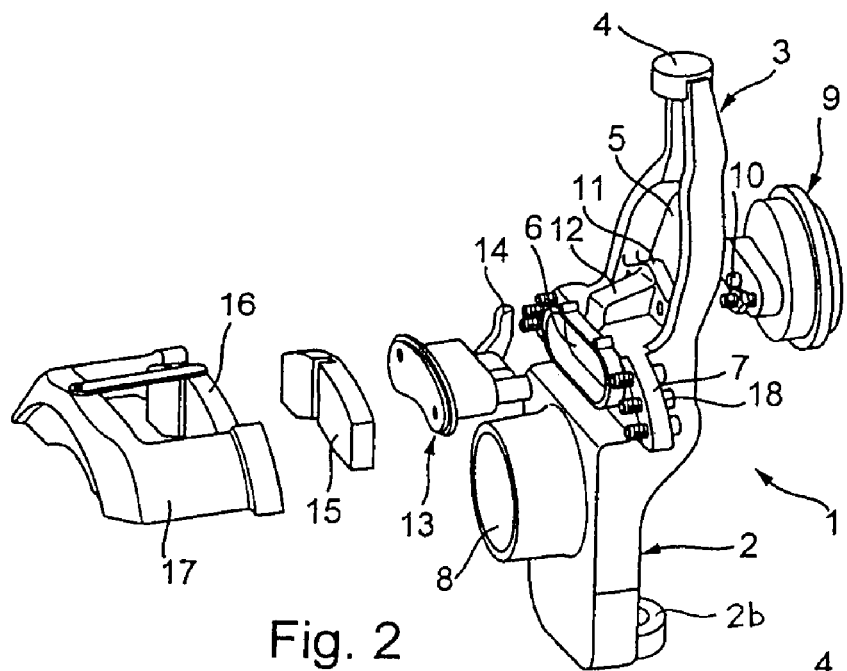
FIG. 2 is an exploded view of a wheel carrier unit according to the invention, showing the brake without a brake disc.

FIG. 2 is an exploded view of a wheel carrier unit 1 according to the invention, showing a disc brake without a brake disc 19. The brake cylinder 9 is shown on the far right.

The brake cylinder 9 has two threaded bolts. The threaded bolts fit into the mounting holes of the brake cylinder holder 11.

The actuating mechanism 10 of the brake cylinder 9 can be seen behind a mounting bolt shown with the associated mounting nut. The actuating mechanism 10 fits into a release mechanism mounting structure 12, which is part of the brake cylinder holder 11 of the wheel carrier unit 1. The release mechanism mounting structure 12 is in the form of a closed housing, which, in addition to the opening for the actuating mechanism 10, has a further connecting opening to the housing 6 of the brake application unit 13.

One possible embodiment of the brake application unit 13 is shown to the left of the wheel carrier unit 1. The brake application unit 13 has a lever arm 14, which extends from the housing 6 of the brake application unit 13 into the actuating mechanism mounting structure 12 and is operatively connected to the actuating mechanism 10. When the brake cylinder 9 is operated, the actuating mechanism 10 is moved. This movement is relayed by the actuating mechanism 10 to the lever arm 14 of the brake application unit 13. The brake application unit 13 transmits this movement to the brake linings 15, 16.

If the brake cylinder 9 in the embodiment represented in FIG. 2 is actuated, the actuating mechanism 10 of the brake cylinder 9 presses on the lever arm 14. The lever arm 14 performs a rotational movement about a shaft, on which it is arranged. The rotational movement of the lever arm 14 is converted by an eccenter arranged on the shaft into a translational movement. The eccenter and the shaft together form an eccentric shaft. The eccenter transmits this translational movement to a pressure piece. The translational movement of the pressure piece is relayed to a toothing on two pressure pistons. The fixed connection of the pressure pistons to a pressure plate means that the movement is transmitted to the brake linings 15, 16.

A first brake lining 15 acted upon by the brake application unit 13 is shown to the left of the brake application unit 13 in FIG. 2.

The bridge or caliper of the disc brake with a second brake lining 16 is shown to the left of the first brake lining 15. In FIG. 2 the wheel carrier unit 1 is provided on its caliper holder 7 with fasteners 18 in the form of bolts for mounting the caliper 17. The caliper 17 provided with the second brake lining 16 is thereby fixed to the caliper holder 7 of the wheel carrier unit 1.

Figure 3:
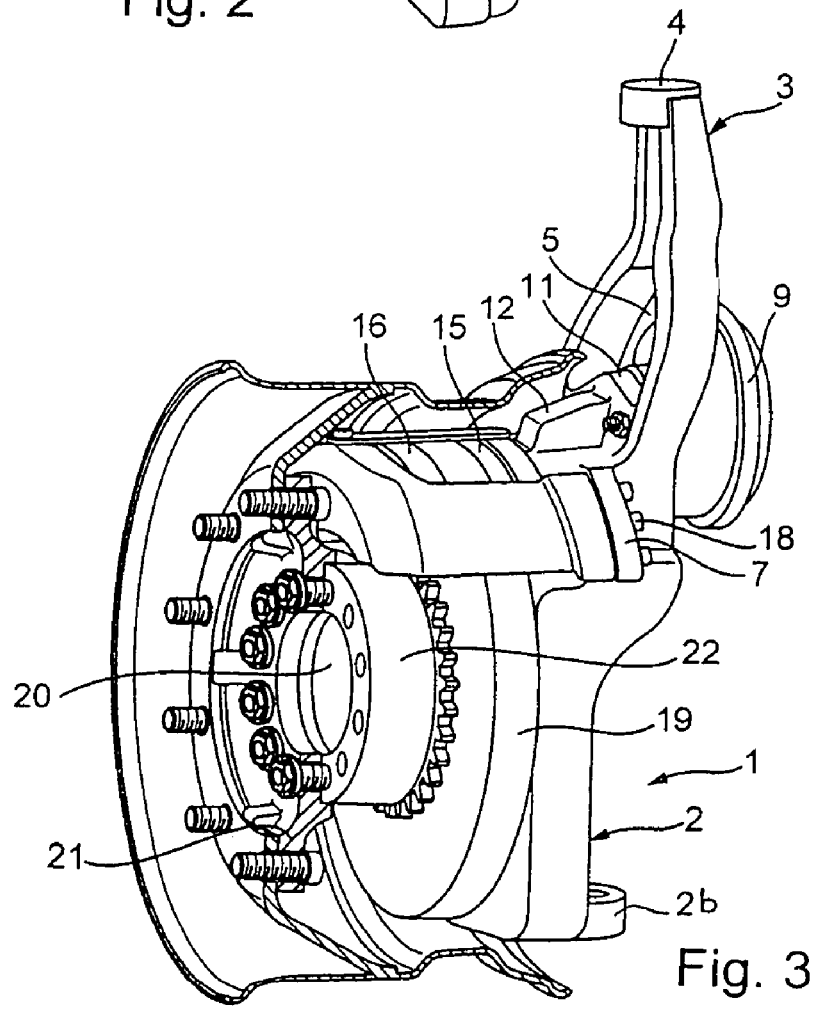
FIG. 3 shows an operative assembly of the wheel carrier unit with the brake, a wheel hub and a rim in half-section.

FIG. 3 shows an operative assembly of the wheel carrier unit 1 with a disc brake, a wheel hub 20 and a rim in half-section. From this it is possible to discern the operating principle of the disc brake and its incorporation into the overall space predefined by the rim and the wheel carrier unit 1.

The wheel hub 20 is arranged in the wheel hub mounting 8 on the wheel carrier unit 1. The wheel hub 20 is bolted to the wheel flange 21, to which the rim is in turn bolted. A toothed rim 22, which is firmly connected to the wheel flange 21 and the wheel hub 20 by the bolting of the wheel flange 21, is arranged between the wheel hub 20 and the wheel flange 21. The brake disc 19 is arranged on the toothed rim 22 and is connected to the toothed rim 22 in such a way that it is axially movable and radially inter-locked. The toothed rim 22 and the brake disc 19 together form a brake disc unit with an axially moveable brake disc 19.

As can be seen from FIG. 2, when the brake cylinder 9 is actuated the brake application unit 13 presses onto the first brake lining 15 of the disc brake. The first brake lining 15 presses onto the brake disc 19 and displaces this axially towards the second brake lining 16. The brake disc 19 presses the second brake lining 16 against the bridge 17, which is firmly bolted to the wheel carrier unit 1 and therefore cannot be deflected any further. The two brake linings 15, 16 now bear firmly against the brake disc 19 and brake the rotational movement of the disc brake. The vehicle is braked.

What is claimed is:

1. A wheel carrier unit (1) comprising
   a flat lower wheel carrier member (2), and
   a forked axle support member (3) extending upwardly from the lower wheel carrier member (2) for connecting the wheel carrier unit (1) to a vehicle body at one end of the wheel carrier unit (1), and a mounting structure (2*b*) arranged at the bottom end of the lower wheel carrier member (2) for connecting the wheel carrier unit (1) to the vehicle body at the other end of the wheel carrier unit (1),
   a brake cylinder (9) arranged on the wheel carrier unit (1) at one side of the forked axle support member (3), the lower wheel carrier member (2) being provided, at the side of the wheel carrier unit (1) opposite the brake cylinder (9), with a wheel bearing mounting sleeve (8) for supporting a wheel hub (20) with a brake disc (19) at the opposite side of the forked axle support member (3),
   a brake caliper (17) mounted to the forked axle support member (3) also on the side of the forked axle support member (3) opposite the brake cylinder (9) for engaging the brake disc (19), and
   a housing (6) arranged on the wheel carrier unit (1) between the brake cylinder (9) and the brake caliper (17) and receiving a brake force application unit (13) serving as mechanical force transmission device between the brake cylinder (a) and the caliper (17).

2. The wheel carrier unit (1) as claimed in claim 1, wherein the brake cylinder (9) is arranged in a mounting opening (5) formed by the forked support member (3).

3. Thee wheel carrier unit (1) as claimed in claim 1, wherein the forked axle support member (3) of the wheel carrier unit (1) forms a brake cylinder holder (11).

4. The wheel carrier unit (1) as claimed in claim 1, wherein a part of the wheel carrier unit (1) is designed as a caliper holder (7) for mounting the caliper (17) of a disc brake.

5. The wheel carrier unit (1) as claimed in claim 4, wherein the holder (7) for the caliper (17) of a disc brake is formed in such a way that fasteners (18) for fixing the caliper (17) to the caliper holder (7) are aligned approximately tangentially to the brake disc (19).

6. The wheel carrier unit (1) as claimed in claim 1, wherein the wheel carrier unit (1) is a casting.

7. The wheel carrier unit (1) according to claim 1, wherein an actuating member (10) is disposed between the brake cylinder (9) at the one side of the axle support member (3) and the brake application unit (13) at the other side of the axle support member (3) for transmitting brake application forces from the brake cylinder (9) to the mechanical force transmission device.

8. The wheel carrier unit (1) according to claim 1, wherein the brake force application unit (13) includes a lever arm (14) operable by the actuating mechanism (10) for transmitting the braking force to brake linings (15, 16) supported by the brake caliper.

* * * * *